United States Patent [19]

Takahashi et al.

[11] Patent Number: 4,984,533

[45] Date of Patent: Jan. 15, 1991

[54] APPLICATION DEVICE

[75] Inventors: Shinsuke Takahashi; Norio Shibata; Tsunehiko Sato, all of Kanagawa, Japan

[73] Assignee: Fuji Photo Film Co., Ltd., Kanagawa, Japan

[21] Appl. No.: 393,336

[22] Filed: Aug. 11, 1989

[30] Foreign Application Priority Data

Aug. 23, 1988 [JP] Japan .................................. 63-207316

[51] Int. Cl.$^5$ ......................... B05C 1/04; B29C 47/16
[52] U.S. Cl. ..................................... 118/419; 425/466
[58] Field of Search ................. 118/419, 405; 425/466

[56] References Cited

U.S. PATENT DOCUMENTS

| | | | |
|---|---|---|---|
| 3,102,302 | 9/1963 | Moore | 425/466 |
| 3,871,812 | 3/1975 | Phipps | 425/466 |
| 3,985,845 | 10/1976 | Akatsuka et al. | 425/466 |
| 4,003,689 | 1/1977 | Harrison et al. | 425/466 |
| 4,145,173 | 3/1979 | Pelzer et al. | 425/466 |
| 4,299,186 | 11/1981 | Pipkin et al. | 118/419 |
| 4,321,884 | 3/1982 | Barkley | 118/419 |
| 4,704,083 | 11/1987 | Iguchi et al. | 425/466 |
| 4,854,844 | 8/1989 | Carlsen | 425/466 |
| 4,863,361 | 9/1989 | Boos | 425/466 |

Primary Examiner—Willard E. Hoag
Attorney, Agent, or Firm—Sughrue, Mion, Zinn, Macpeak & Seas

[57] ABSTRACT

An extrusion-type liquid application device having a simple construction but in which the width of the coating slit can easily be adjusted, even during a coating operation. Thick members are mounted on the doctor portion of a coating head extending perpendicular to the liquid discharge portion of the coating head. The thick members have acting portions at their upper ends abutting the surface of the doctor portions, central fulcrum portions, and opposite end portions provided with adjusting members. By adjusting the adjusting members, the slit width can be adjusted.

7 Claims, 4 Drawing Sheets

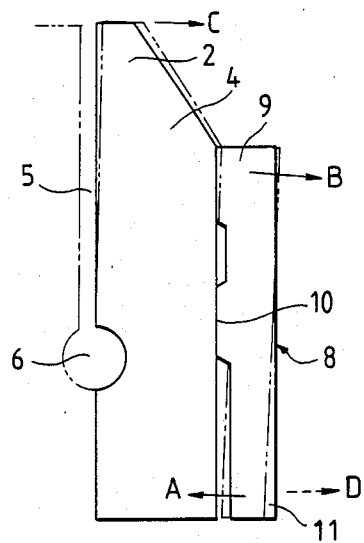
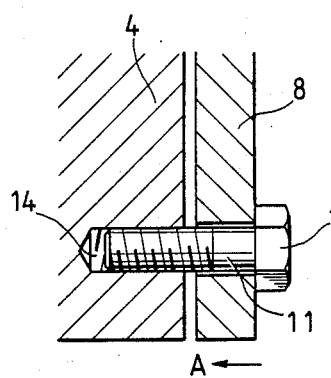 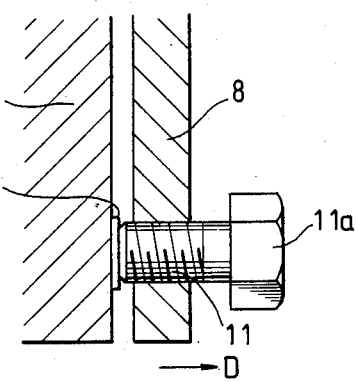

APPLICATION DEVICE

BACKGROUND OF THE INVENTION

The present invention relates to an application device for applying a coating liquid such as a photographic photosensitive liquid, a magnetic liquid or a surface-protective liquid to a moving flexible carrier made of a plastic film, paper, a metal sheet or the like and hereinafter referred to as a web.

Conventional application devices for applying a liquid to a web include those of the roll type, the bead type, the slide coating type, and the extrusion type. In the application device to which the present invention relates, the liquid is discharged under appropriate pressure from the slit of an application head of the device, as in the conventional application device of the extrusion type. Since the width of the conventional application device of the extrusion type corresponds to that of the web, which is about 0.5 m to 3.0 m, the device has the problem that it is difficult to make the thickness of the applied liquid on the web uniform along the width thereof In particular, when a magnetic liquid of high viscosity is applied to a web with the conventional application device of the extrusion type, the liquid is discharged under prescribed pressure from the slit of the application head of the device while the head is urged against the moving web to apply the liquid thereto In this device, it is very difficult to make the distribution of the pressure of the magnetic liquid uniform along the length of the slit. Therefore, the thickness of the liquid applied to the web is not uniform along the width of the web.

In order to solve this problem, various application devices in which the width of the slit of an application head for applying a liquid to a web can be adjusted to enhance the uniformity of the thickness of the applied liquid on the web have been proposed, as disclosed, for instance, in Japanese Unexamined Published Patent Applications Nos. 291117/86 and 2610225/86.

In the application device disclosed in application No. 291117/86, the liquid discharge portion of the application head 20 is provided with a lip 21, a recess 22, and a plurality of screws 24, as shown in FIG. 8. The lip can be moved forward & and aft by manipulating the screws. However, it is very difficult and hardly possible to manipulate the screws 24 during the application of the liquid to the web. Since the liquid discharge portion of the application head 20 is provided with the lip 21, the recess 22, and the screws 24, the head is difficult to manufacture and the maintenance thereof is cumbersome. The freedom of design of the head is also quite limited.

In the application device disclosed in Application No. 261022/86, a force is applied to the lip 22 of the liquid discharge portion of the application head 20 by screws 24, as shown in FIG. 9. Also, the head 20 is provided with heaters 25 capable of heating the shanks of the screws 24 to expand them. Thus, the screws 24 do not need to be manually manipulated. However, the construction of the application head 20 is again complex, its maintenance difficult, and the freedom of design limited. Moreover, the cost of this application head is high.

SUMMARY OF THE INVENTION

The present invention was made in order to solve the above-discussed problems.

Accordingly, it is an object of the present invention to provide an application device which does not have such constitution as to restrict the degree of freedom of design of the application head. It is a further object to provide an application device in which the width of the slit of the head can be easily adjusted, even during the application of a liquid to a web, so as to make the applied liquid layer uniform in thickness with good surface properties.

In the application device provided according to the present invention, liquid is discharged from the slit of the application head extending along the width of the continuously moving web to apply the liquid to the surface of the web. Thick members provided on the outside of the application head have acting portions at the ends thereof near the liquid discharge portion of the head. The thick members extend from the above-mentioned ends thereof to the other ends thereof in directions reverse to the liquid discharge portion of the head and are provided with adjusting members at the latter ends, whereby the forces applied to the acting portions are adjusted with the adjusting members to adjust the width of the slit of the head.

BRIEF DESCRIPTION OF THE DRAWINGS

FIG. 3 is a side view of the application head of FIG. 1;

FIGS. 4, 5, 6 and 7 are cross-sectional partial views of various adjusting mechanisms used in the present invention;

DESCRIPTION OF THE PREFERRED EMBODIMENTS

Preferred embodiments of the present invention are hereafter described in detail with reference to the attached drawings.

Figure 1:
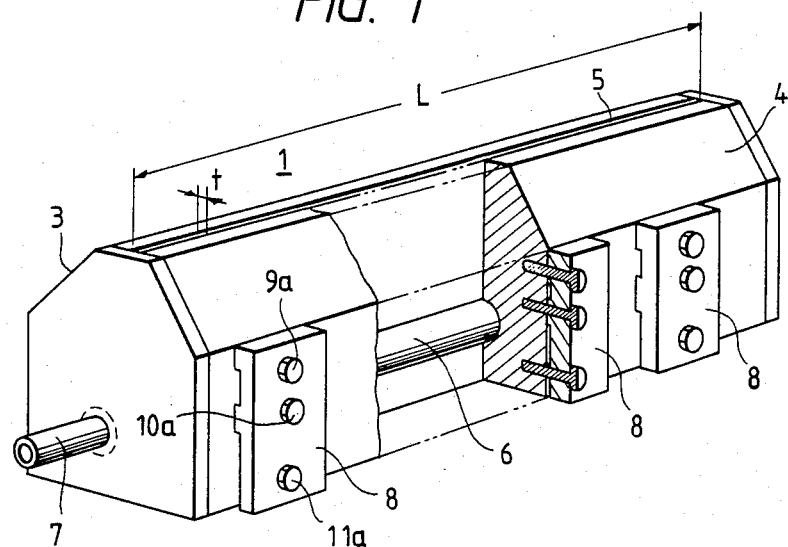
FIG. 1 is a cutaway perspective view of an extrusion-type application head of an application device constructed in accordance with a preferred embodiment of the present invention.
Figure 2:
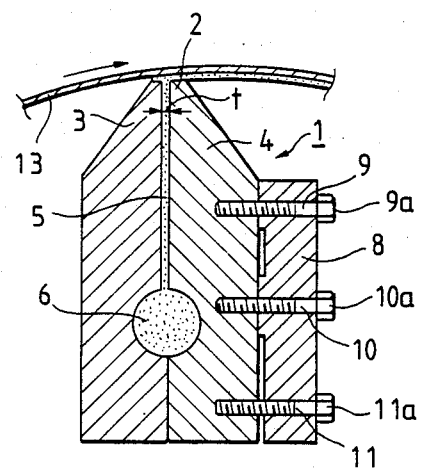
FIG. 2 is a cross-sectional view of the application head of FIG. 1.

FIG. 1 is a cutaway perspective view of an extrusion-type application head 1 of an application head constructed in accordance with the invention. The application head 1 has a liquid reservoir 6 provided inside the head and communicating with a liquid feed port 7. The length L of the liquid reservoir 6 corresponds to the width of a web 13 (FIG. 2). The application head 1 has a slit 5 defined between a rear part 3 and a doctor part 4. The coating liquid is discharged from the slit extending along the width of the head. In accordance with the invention, the application head 1 is also provided with thick members 8 and screws 11a. The thick members 8 are provided on the outside of the head on the side of the doctor part 4. The screws 11a are fitted as adjusters in the thick members 8. The members 8 extend on the outside of the application head 1 from the intermediate portion in directions perpendicular to the liquid discharge portion 2 thereof, that is, perpendicular to the web 13 at the point of application of the liquid, and are firmly secured at the acting portions 9 of the thick members to the head by screws 9a near the doctor part 4 of the head. The screws 11a for applying forces to the acting portions 9 of the thick members 8 are fitted in the adjusting portions 11 of the members near the ends which are located opposite the doctor part 4 of the application head 1. The width t of the liquid discharge portion of the slit 5 can be adjusted by turning the screws 11a. The central portions 10 of the thick members 8, which act as fulcrum portions, are coupled to the outside of the head 1 by screws 10a. That is, the central portions 10 do not need to be firmly fixed to the head by the screws, but are positioned on the head so as to serve as leverage fulcra.

The adjusting action of the thick members 8 will now be described with reference to FIG. 3.

When the adjusting portions 11 of the thick members 8 are moved toward the outside of the application head 1 in a direction A, the acting portions 9 of the thick members, which are located opposite the adjusting portions across the fulcrum portions 10 of the members, are moved in a direction B reverse to the direction A so that the liquid discharge portion of the doctor part 4 is displaced in a direction C parallel with the direction B to thus increase the width t of the slit 5. At this time, the thick members 8 are elastically deformed. The rigidity of the members 8 is determined in consideration of the rigidity of the liquid discharge portion of the doctor part 4 so that the range of the adjustment of the width t of the slit 5 is appropriate.

If the width t of the slit 5 is to be increased, screws 11a of smaller diameter are loosely fitted in the adjusting portions 11 of the thick members 8 and engaged in the tapped holes 14 of the application head 1, as shown in FIG. 4, and are then screwed into the tapped holes so that the adjusting portions are moved in the direction A, thus increasing the width of the slit. If the width t of the slit 5 is to be decreased, larger diameter screws 11a are threadedly engaged in the tapped holes of the adjusting portions 11 of the thick members 8 and their ends located in contact with contact members 15 on the outside of the application head 1 at the tips of the shanks of the screws, as shown in FIG. 5, and are then screwed into the adjusting portions so that the adjusting portions are moved in a direction D reverse to the direction A, thus decreasing the width of the slit.

Figure 6:
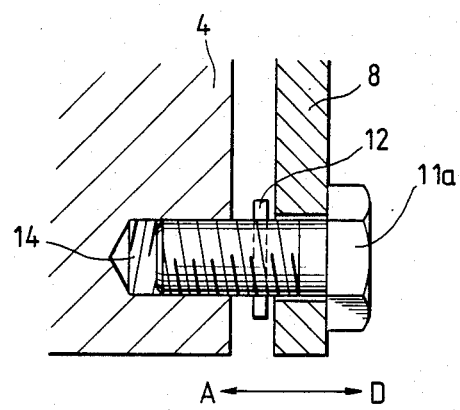

The present invention is not limited to the slit width adjusting mechanisms shown in FIGS. 4 and 5, but may be otherwise embodied so that the application head 1 is provided with a slit width adjusting mechanism for both increasing and decreasing the width of the slit 5. For example, the screws 11a may be provided with flanges 12 between the outside of the application head 1 and the heads of the screws, as shown in FIG. 6, so that the application head has the same constitution as that shown in FIG. 4 except for the flanges. In that case, the screws are turned with the heads or flanges thereof in contact with the adjusting portions 11 of the application head 1 to move the adjusting portions in the direction A or D to increase or decrease the width of the slit 5.

Figure 7:
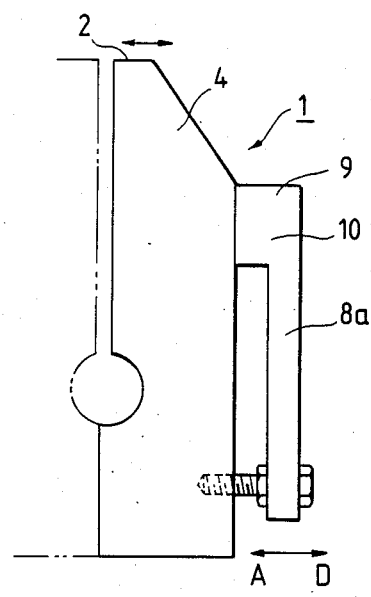
Figure 8:
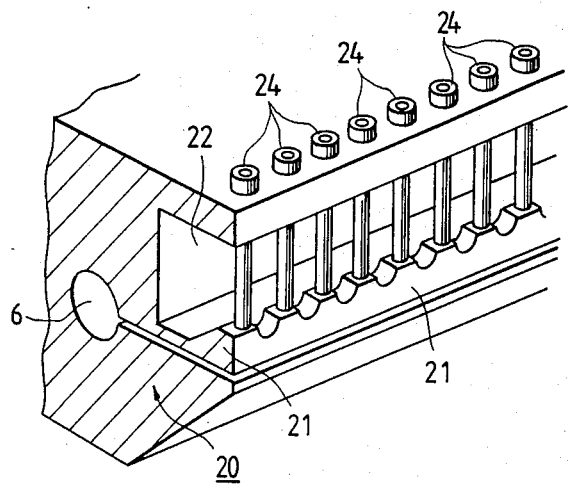
FIG. 8 is a perspective view of a conventional application head.
Figure 9:
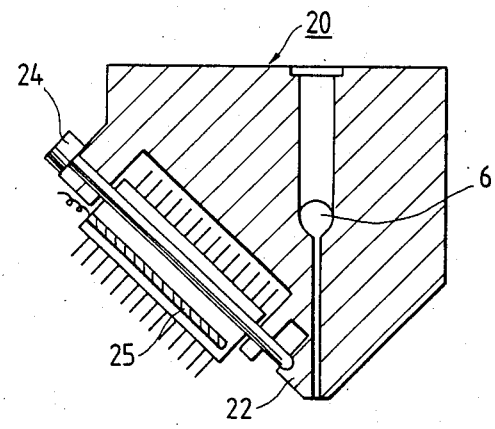
FIG. 9 is a cross-sectional view of another conventional application head.

The application head 1 may be provided with other thick members 8a in which acting portions 9 and fulcrum portions 10 are integrally conjoined to each other as shown in FIG. 7.

A process of applying the coating liquid to the web 13 with the above application device will now be described. As shown in FIG. 2, the liquid is supplied under prescribed pressure to the liquid reservoir 6 in the application head 1 through the liquid feed port 7 by a liquid feed unit (not shown) so that the liquid is discharged from the slit 5 throughout the length thereof and then applied to the surface of the web 13. The thickness of the film of the liquid applied to the web 13 would likely become nonuniform for various reasons, such as the pressure of the liquid discharged from the slit 5 not being uniform along the length of the slit because the liquid is supplied to the liquid reservoir 6 through one side of the application head 1. Accordingly, the screws 11a for the adjusting portions 11 of the thick members 8 are appropriately preset to make the pressure of the discharged liquid uniform so as to prevent the thickness of the film of the applied liquid on the web 13 from becoming nonuniform.

However, since the conditions of application sometimes change, only the initial presetting of the screws 11a to make the pressure of the discharged liquid uniform may not be enough to maintain the thickness of the applied coating uniform. On the other hand, the screws 11a can be very easily reset during the application of the liquid to keep the pressure of the discharged liquid uniform to prevent the thickness of the film of the applied liquid on the web 13 from varying because the screws are located at a sufficiently large distance from the moving web 13 so as to allow their adjustment during a coating operation. Thus, the thickness of the film of the liquid applied to the web 13 by the application device can be made uniform.

The present invention may be embodied or practiced in various other ways without departing from the spirit or essential character thereof. For example the form and number of the thick members 8 and 8a may be appropriately altered, and the screws 11a may be replaced with wedges, heated bolts, or a combination of such elements. Also, the present invention may be embodied as an application device which does not employ an extrusion-type application head but is any other type in which a liquid is applied to a continuously moving web.

In an application device provided according to the present invention, a liquid is discharged from the slit of an application head extending along the width of a continuously moving web so that the liquid is applied to the surface of the web. Thick members are provided on the outside of the application head having acting portions at their ends near the liquid discharge portion of the application head located at the web. The thick members extend from the above mentioned ends thereof to the other ends thereof in directions perpendicular to the liquid discharge portion of the application head. Adjusting screws for applying forces to the acting portions of the thick members are fitted in the thick members at the ends thereof located opposite the liquid discharge portion of the application head, whereby the width of the slit of the head can be adjusted by setting the adjusting screws. Since the adjustment of the width of the slit is performed through the leverage of the thick members by adjusting the adjusting screws at a point a large distance from the web, the adjustment is very easy to perform even during application of liquid to the web. For this reason, the discharged quantity of the liquid to be applied to the web can be accurately controlled despite changes in the conditions of application so as to make the uniformity of the thickness of the applied liquid on the web very high. Since the slit width adjustment mechanism of the application device is simpler than those of conventional application devices, the invention results in lower costs and easier maintenance in comparison with the latter. Since the liquid discharge portion of the application head does not have a recess or the like which would restrict the design of the constitution of the head, the degree of freedom of designing the head is sufficiently high to make it possible to use the application device under a wide range of application conditions.

What is claimed is:

1. An application device in which a liquid is discharged from a slit of an application head extending along the width of a continuously moving flexible carrier so that said liquid is applied to the surface of said carrier, the improvement comprising: a plurality of thick members provided on an outside of said head, said thick members having acting portions at ends thereof near a liquid discharge portion of said head, said members extending from said ends to the other ends thereof in directions perpendicular to said liquid discharge portion of said head, said members being provided with adjusting members at said other ends to apply forces to said acting portions to adjust a width of said slit, said thick members each having an integral, generally central, fulcrum portion in contact with the head.

2. The application device of claim 1, wherein said application head has a rear portion and a doctor portion, said thick members being located on a side surface of said doctor portion.

3. The application device of claim 2, further comprising screws for fixing said acting portions to said doctor portion.

4. The application device of claim 3, wherein said other end of each of said thick members is spaced from said side surface of said doctor portion.

5. The application device of claim 4, wherein said adjusting members comprise screws threadedly engaged with said thick members and having heads abutting said surface of said doctor portion.

6. The application device of claim 4, wherein said adjusting members comprise screws threadedly engaged with said doctor portion and passing loosely through said thick portions.

7. The application device of claim 6 wherein each of said screws has a head located on a side of a respective one of said thick members opposite said surface of said doctor portion and a flange portion located between said thick member and said surface of said doctor portion.

* * * * *